(12) United States Patent
David et al.

(10) Patent No.: US 10,139,841 B2
(45) Date of Patent: Nov. 27, 2018

(54) OVERFILL PREVENTION VALVE ASSEMBLY

(71) Applicant: Clay and Bailey Manufacturing Company, Kansas City, MO (US)

(72) Inventors: Donald R. David, Raytown, MO (US); George Andrew Borst, Kansas City, MO (US); Timothy D. Noel, Independence, MO (US); Jacob Adam Ritter, Harrisonville, MO (US)

(73) Assignee: Clay and Bailey Manufacturing Company, Kansas City, MO (US)

( * ) Notice: Subject to any disclaimer, the term of this patent is extended or adjusted under 35 U.S.C. 154(b) by 105 days.

(21) Appl. No.: 15/263,082

(22) Filed: Sep. 12, 2016

(65) Prior Publication Data

US 2018/0074526 A1 Mar. 15, 2018

(51) Int. Cl.
*F16K 31/20* (2006.01)
*G05D 9/02* (2006.01)

(52) U.S. Cl.
CPC ............... *G05D 9/02* (2013.01); *F16K 31/20* (2013.01); *Y10T 137/7426* (2015.04)

(58) Field of Classification Search
CPC ......... Y10T 137/7358; Y10T 137/7368; Y10T 137/7341; Y10T 137/7374; Y10T 137/7404; Y10T 137/7423; Y10T 137/7426; Y10T 137/7433; Y10T 137/7465; Y10T 137/7472; G05D 9/02; G05D 16/12; F16K 31/20; F16K 31/18; F16K 31/24; F16K 31/34; F16K 33/00; F16K 21/16; F16K 21/165; B60K 2015/0772; B60K 2015/03289; B67D 7/365; B67D 7/367; B67D 2210/00154; F17C 5/02; F17C 5/06; F17C 5/002; F17C 5/007
USPC ....... 137/409, 442, 444, 423, 429, 430, 432, 137/412–414; 141/95, 98, 141
See application file for complete search history.

(56) References Cited

U.S. PATENT DOCUMENTS

| | | | | |
|---|---|---|---|---|
| 3,470,915 A | * | 10/1969 | Bitzer | B60S 1/10 138/43 |
| 3,625,264 A | * | 12/1971 | Swain | F16K 31/20 137/413 |
| 4,106,536 A | * | 8/1978 | Coquerel | B67D 7/367 141/220 |

(Continued)

*Primary Examiner* — Craig J Price
(74) *Attorney, Agent, or Firm* — Hovey Williams LLP

(57) ABSTRACT

An overfill prevention system for use with a liquid storage tank includes a valve assembly defining a downwardly open liquid discharge opening. A pilot tube is fixed relative to and projects downwardly relative to the valve assembly. The pilot tube defines an internal channel in fluid communication with the valve assembly and a discharge hole spaced downwardly from the valve assembly and in fluid communication with the internal channel and the tank. A float is buoyantly shiftable along the pilot tube between an open position in which the float exposes the discharge hole when liquid within the tank is below a predetermined level, and a closed position in which the float covers the discharge hole when liquid within the tank reaches or exceeds the predetermined level. A flow diverter is disposed between the discharge opening and the float to deflect liquid from the discharge opening away from the float.

30 Claims, 11 Drawing Sheets

(56) References Cited

U.S. PATENT DOCUMENTS

| | | | | |
|---|---|---|---|---|
| 4,305,422 A | * | 12/1981 | Bannink | F16K 1/305 |
| | | | | 137/415 |
| 5,427,137 A | * | 6/1995 | Bowen | B67D 7/365 |
| | | | | 116/204 |
| 5,787,942 A | * | 8/1998 | Preston | F16K 31/30 |
| | | | | 137/427 |
| 5,829,465 A | * | 11/1998 | Garretson | F16K 21/165 |
| | | | | 137/2 |
| 5,832,953 A | | 11/1998 | Lattner et al. | |
| 6,230,730 B1 | * | 5/2001 | Garretson | F16K 1/307 |
| | | | | 137/2 |
| 6,257,287 B1 | * | 7/2001 | Kippe | B60K 15/03504 |
| | | | | 137/202 |
| 6,318,421 B1 | * | 11/2001 | Lagache | B67D 7/367 |
| | | | | 137/430 |
| 7,584,766 B2 | | 9/2009 | David et al. | |

\* cited by examiner

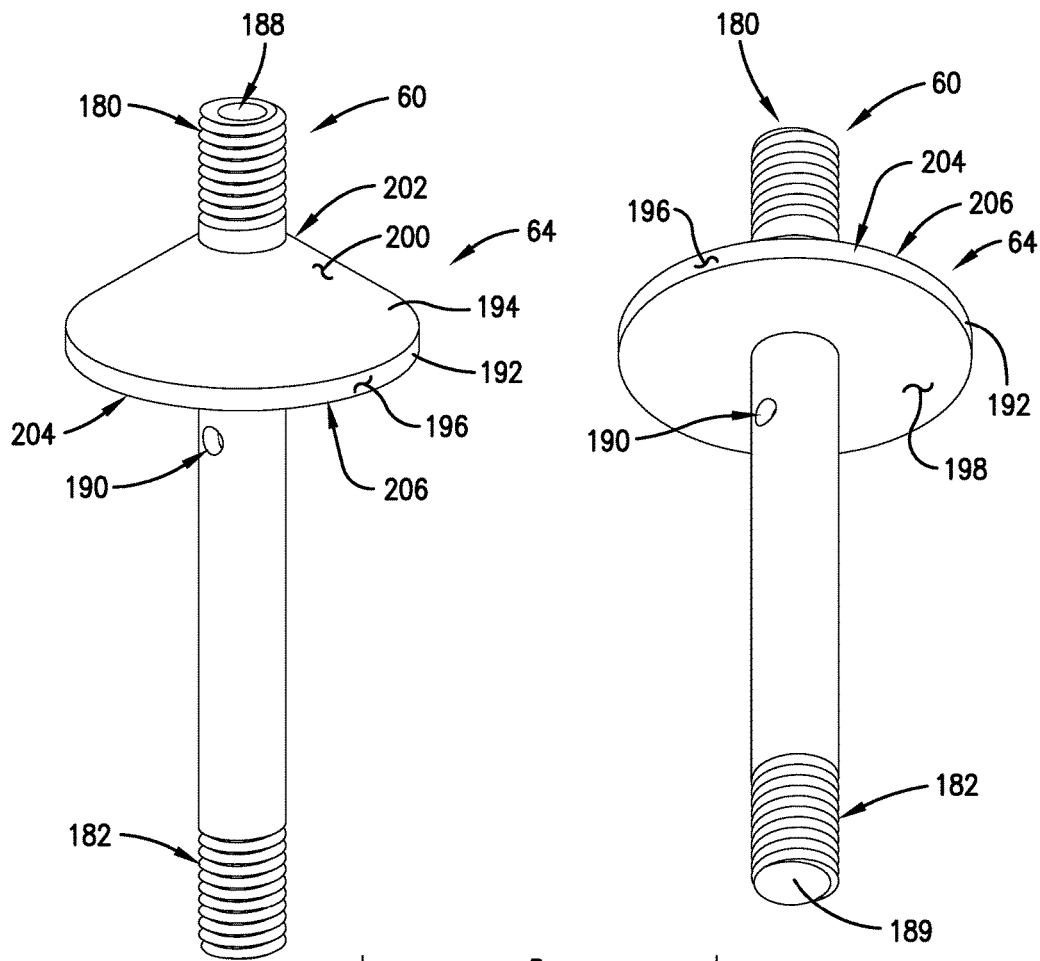
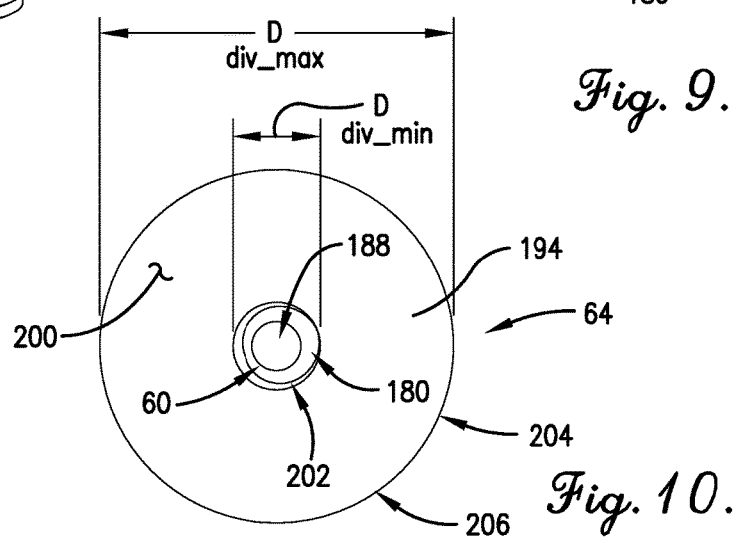
Fig. 8.   Fig. 9.   Fig. 10.

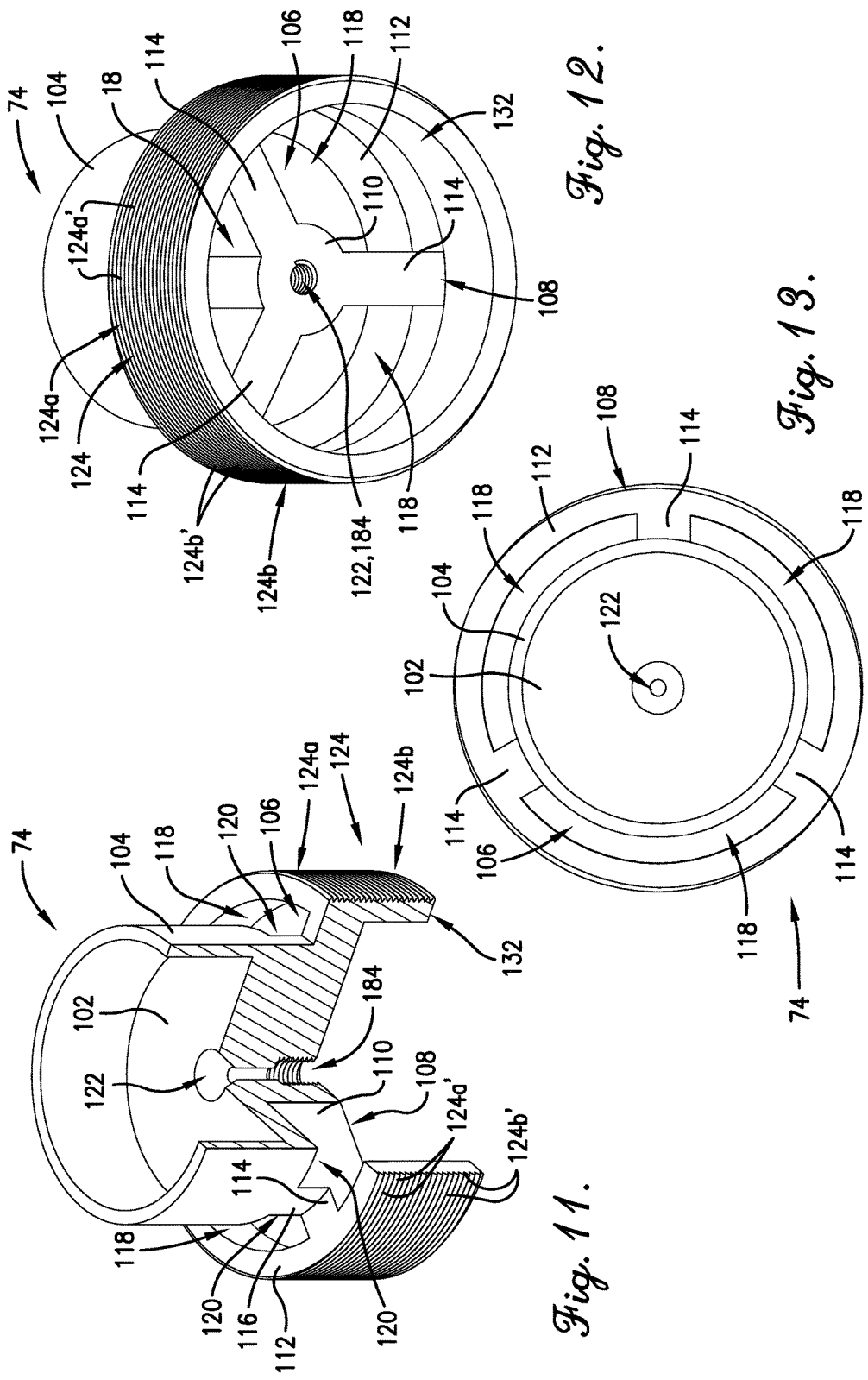

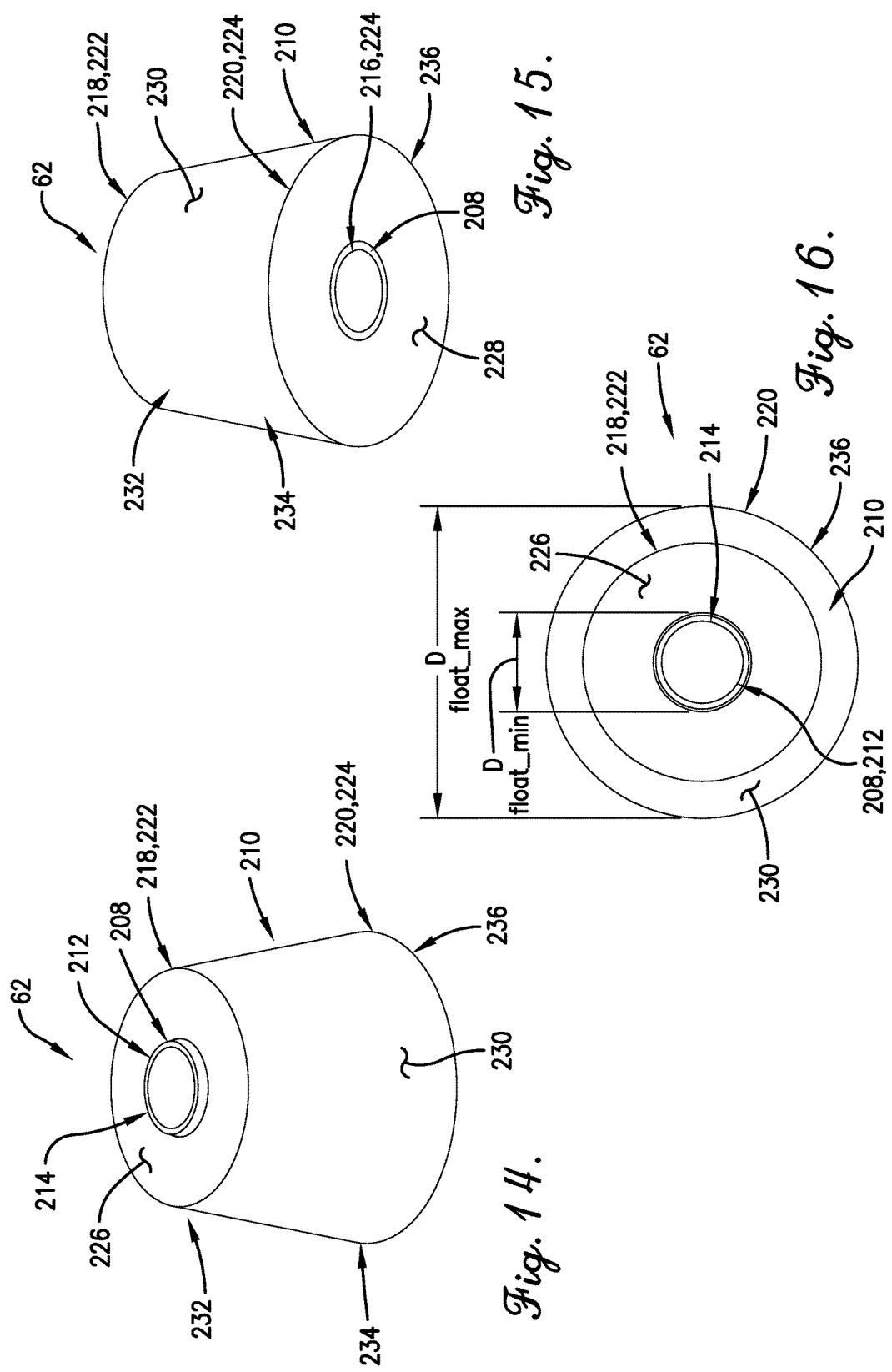

OVERFILL PREVENTION VALVE ASSEMBLY

BACKGROUND

1. Field of the Invention

The present invention relates generally to devices for controlling flow of a liquid. More particularly, the present invention concerns a valve configured to prevent overfilling of a liquid storage tank, such as a shallow tank used to hold home heating oil, diesel fuel for backup generators, etc.

2. Discussion of the Prior Art

As is readily apparent to those having ordinary skill in the art, liquid storage tanks of the type described above are conventionally filled from a tank truck by means of a hose extending from the truck and coupled to the tank by means of an inlet pipe or fitting. The liquid is typically pumped into the tank at relatively high pressures. Although it is not unusual for the associated pump to be configured to shift into a by-pass mode based on an integrated back-pressure sensor, it is often desirable for pump shut-off to occur prior to such a shift. For instance, in some systems, waiting for the pump to go into by-pass mode may result in overflow of the tank (e.g., via spillage from a vent). That is, back-pressure sensing may result in too late a shut-off. In contrast, too early a shut-off results in an inadequately full (i.e., too empty) tank. Thus, it is desirable for a device to be provided to enable reliable and effective automatic shut-off of liquid flow to the tank when the tank is sufficiently but not overly full.

SUMMARY

The following brief summary is provided to indicate the nature of the subject matter disclosed herein. While certain aspects of the present invention are described below, the summary is not intended to limit the scope of the present invention.

According to one aspect of the present invention, an overfill prevention system for use with a liquid storage tank is provided. The system comprises a valve assembly, a pilot tube, a float, and a flow diverter. The valve assembly defines a downwardly open discharge opening configured to discharge liquid at least principally in a downward direction. The pilot tube is fixed relative to and projects downwardly relative to the valve assembly. The pilot tube defines an internal channel in fluid communication with the valve assembly. The pilot tube further defines a discharge hole spaced downwardly from the valve assembly and in fluid communication with the internal channel and the tank. The float is buoyantly shiftable along the pilot tube between an open position in which the float exposes the discharge hole when liquid within the tank is below a predetermined level, and a closed position in which the float covers the discharge hole when liquid within the tank reaches or exceeds the predetermined level. The flow diverter is disposed between the discharge opening and the float. The flow diverter is configured to deflect liquid from the discharge opening away from the float.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 6 is an exploded top perspective view of the overfill prevention system of FIGS. 1-5a;

FIG. 8 is a top perspective view of the flow diverter and pilot tube of the overfill prevention system of FIGS. 1-7;

FIG. 9 is a bottom perspective view of the flow diverter and pilot tube of FIG. 8;

FIG. 10 is a top view of the flow diverter and pilot tube of FIGS. 8 and 9;

FIG. 11 is a partially sectioned top perspective view of the downstream portion of the valve body of FIGS. 1-7;

FIG. 12 is a bottom perspective view of the downstream portion of FIG. 11;

FIG. 13 is a top view of the downstream portion of FIGS. 11 and 12;

FIG. 14 is a top perspective view of the float of the overfill prevention system of FIGS. 1-7;

FIG. 15 is a bottom perspective view of the float of FIG. 14; and

FIG. 16 is a top view of the float of FIGS. 14 and 15.

Figure 1:
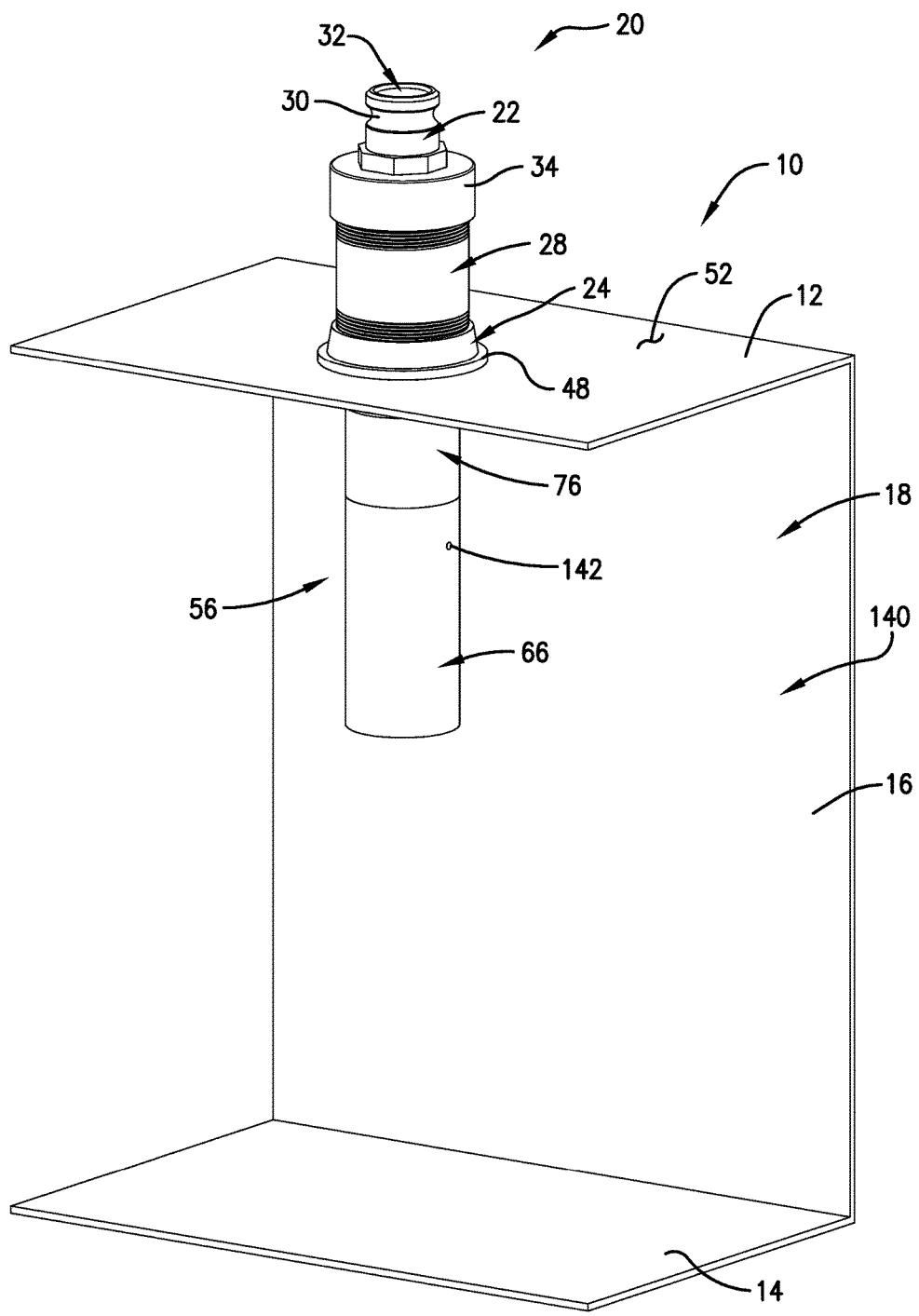
FIG. 1 is a fragmentary top perspective view of an overflow prevention system installed on a tank.

The drawing figures do not limit the present invention to the specific embodiments disclosed and described herein. The drawings are not necessarily to scale, emphasis instead being placed upon clearly illustrating the principles of the preferred embodiment.

Furthermore, directional references (e.g., top, bottom, front, back, side, etc.) are used herein solely for the sake of convenience and should be understood only in relation to each other unless otherwise made clear. For instance, a component might in practice be oriented such that faces referred to as "top" and "bottom" are sideways, angled, inverted, etc. relative to the chosen frame of reference. Similarly, terms such as "proximal" and "distal" should be understood in a relative sense. Yet further, locational descriptions such as "radially inner," "radially outer," etc. should not be construed as limiting the subject structure to a circular form unless otherwise specified.

DETAILED DESCRIPTION OF THE PREFERRED EMBODIMENTS

FIG. 1 illustrates a portion of a tank 10 for storing a liquid (not shown). The tank 10 preferably includes a top wall 12, a bottom wall 14, and a side wall 16 cooperatively at least in part defining a tank interior 18. In the illustrated embodiment, the top and bottom walls 12 and 14 are arranged in parallel with one another, with the side wall 16 extending generally orthogonally relative to the top and bottom walls 12 and 14. Alternative orientations are permissible, however. For instance, non-orthogonal and/or non-parallel relationships might be defined. Furthermore, although the walls 12, 14, and 16 as illustrated are flat, it is permissible for the tank to includes one or more curved walls. For instance, the tank might be domed or entirely or partially spherical, capsular, ovoidal, ellipsoidal, etc. That is, the present invention is broadly applicable to a wide range of tank designs.

Preferably, as will be apparent upon further discussion below and as will be understood by one having ordinary skill in the art, the tank 10 is a generally shallow tank prone to overfilling. However, as noted above, a wide range of tank designs are permissible.

In a preferred embodiment, the tank 10 presents a height measured vertically between the top and bottom walls 12 and 14. The height is most preferably between about eight inches (8") and about forty-eight inches (48"). Again, however, a wide range of tank designs are permissible.

The tank 10 may be used for any one or more of a variety of purposes, including but not limited to storage and/or dispensation of home heating oil, diesel fuel for backup generators, etc.

Inlet Fitting

The tank 10 is preferably filled by means of a hose (not shown) extending from a tank truck (not shown) and coupled to the tank 10 by means of an inlet fitting 20. Preferably, the liquid is pumped into the tank 10 at relatively high pressures by a pump (not shown) mounted to the truck. The pump is preferably configured to shift into by-pass mode based on an integrated back-pressure sensor, thus stopping additional fluid from being pumped into the tank once sufficient pressure is sensed, although such a feature is not critical to the present invention (and may omitted).

In a preferred embodiment, as best shown in FIGS. 1-4, the inlet fitting 20 is disposed in the top wall 12 of the tank 10, although alternate positioning is permissible according to some aspects of the present invention.

The inlet fitting 20 is also preferably generally straight and vertically oriented, although alternative orientations and curves or bends may be present in some configurations. For instance, the fitting might alternatively be generally L-shaped, with a horizontal portion of the L extending into an upper portion of a side wall of the tank. As will be apparent from the below discussion, however, it is preferred that the fitting include at least one portion that is generally straight and vertically oriented, and that the fitting be disposed in a relatively upper portion of the tank 10.

Preferably, the inlet fitting 20 includes a source coupler or collar 22, a tank coupler 24, an inlet extension tube of fill pipe 26, and an inlet extension shell 28 that at least substantially circumscribes the inlet extension tube 26 and interconnects the source coupler 22 and the tank coupler 24.

The source coupler 22 preferably includes a hose neck 30 defining an internal hose bore 32 for receiving the hose. The source coupler 22 further preferably includes a base 34 defining a radially smaller, threaded extension tube bore 36 and a radially larger, threaded extension shell bore 38. The inlet extension tube 26 preferably includes a threaded upper end 40 that is threadably received in the extension tube bore 36. Similarly, the inlet extension shell 28 preferably includes a threaded upper end 42 that is threadably received in the extension shell bore 38.

The tank coupler 24 preferably includes a shell-receiving neck 44 defining a threaded internal interface bore 46 and a tank-engaging flange 48 extending radially outwardly from the shell-receiving neck 44. The tank-engaging flange 48 is preferably fixed to the top wall 12 of the tank 10 by any one or more of a variety of means, including but not limited to welding or adhesives. Preferably, such fixation means retain the structural integrity of the top wall 12 to restrict associated ingress of contaminants into the tank or leakage of liquid out of the tank.

As illustrated, the inlet extension shell 28 preferably includes a threaded lower end 50 that is threadably received in the interface bore 46. Preferably, the lower end 50 of the inlet extension shell 28 extends downwardly so as to be at least substantially flush with an outer face 52 of the top wall 12.

A tank opening 54 is preferably defined in the top wall 12 of the tank 10. The inlet extension tube 26 preferably extends downwardly through the tank opening 54 into the tank interior 18. Thus, liquid may be pumped from the hose into the inlet extension tube 26 via the source coupler 22, and then into the tank interior 18 via the inlet extension tube 26.

It is noted that, as illustrated, the source coupler 22, the inlet extension shell 28, the tank coupler 24, and the top wall 12 of the tank 10 cooperatively form a protective barrier about the inlet extension tube 26.

Furthermore, alternative inlet fitting designs may be used without departing from the scope of the present invention. For instance, although the source coupler 22, the inlet extension shell 28, the tank coupler 24, and the inlet extension tube 26 each preferably present generally circular cross-sectional shapes, alterative geometries (e.g., a rectangular or box-like) are permissible. Another preferred alternative configuration is disclosed in U.S. Pat. No. 7,584,766, issued Sep. 8, 2009, and entitled OVERFILL PREVENTION VALVE FOR SHALLOW TANKS. The above-referenced document is incorporated in its entirety by reference herein.

Overfill Prevention System Structure Overview

In a preferred embodiment, an overfill prevention system 56 is provided to at least substantially prevent or reduce the risk of overfilling of the tank 10. The preferred overfill prevention system 56 broadly includes a valve assembly 58, a pilot tube 60, a float 62, a flow diverter 64, and a drop tube 66.

As will be discussed in greater detail below, the valve assembly 58 is preferably fluidly interconnected at an upper end thereof to the inlet extension tube 26 at a lower end thereof to the drop tube 66.

Preferably, as illustrated, the valve assembly 58 and the drop tube 66 are disposed entirely within the tank interior 18. However, it is permissible according to some aspects of the present invention for the valve assembly to be in whole or in part disposed outside the tank interior. For instance, the tank might alternatively be fitted with an external riser pipe in which the valve assembly is dispose in such a manner as to be above the top wall of the tank.

Furthermore, in certain alternative arrangements, it may be preferable to omit the drop tube entirely.

Valve Assembly

Figure 5:
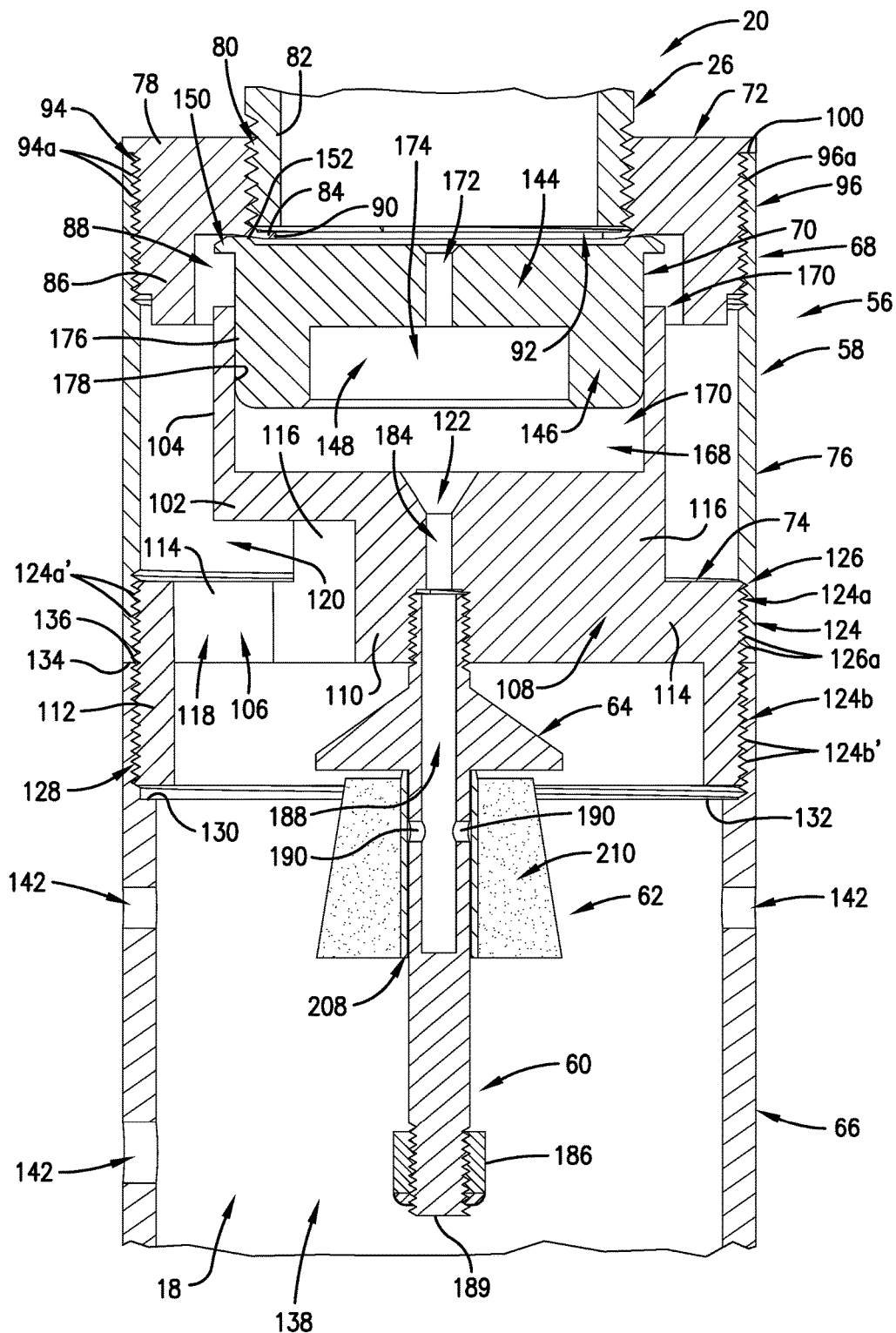
FIG. 5 is an enlarged front cross-sectional view of a portion of the overfill prevention system of FIGS. 1-4, with the float in the uppermost closed float position and the piston in the closed valve position.

The valve assembly 58 preferably includes a hollow valve body 68 and a piston 70. As best shown in FIG. 5, the valve body 68 preferably includes an upstream portion or cap 72, a downstream portion or base 74 spaced axially downwardly from the upstream portion 72, and an outer shell 76 extending between and interconnecting the upstream and downstream portions 72 and 74, respectively.

Upstream Portion

The upstream portion 72 is preferably generally toroidal in form. More particularly, the upstream portion 72 preferably includes a generally laterally extending annular main body 78 defining a central, threaded extension tube-receiving bore 80 that threadably receives a threaded lower end 82 of the inlet extension tube 26. The upstream portion 72 further preferably includes a shelf 84 extending radially inwardly from the main body 78. The lower end 82 of the inlet extension tube 26 preferably extends downwardly into engagement with the shelf 84.

The upstream portion 72 further preferably includes a circumferential skirt 86 extending generally axially from the main body 78. As will be discussed in greater detail below, the skirt 86 defines a piston-accommodating space 88.

Preferably, the shelf 84 presents an innermost face 90 of the upstream portion 72, with the innermost face 90 defining a valve inlet 92. As will be apparent from the above description of the inlet fitting 20, the valve inlet 92 is preferably configured to receive pressurized liquid for filling of the tank 10.

The main body 78 and the skirt 86 are preferably continuously externally threaded to define an upstream portion externally threaded region 94. The outer shell 28 preferably includes a shell upper internally threaded region 96 that at least substantially circumscribes and threadably engages the upstream portion externally threaded region 94 so as to fix the upstream portion 72 relative to the shell 28.

Preferably, as best shown in FIG. 5, the upstream portion 72 includes a flange 98 extending generally laterally outwardly from the main body 78. Interconnection of the upstream portion and the shell 28 is preferably complete when an upper margin 100 of the shell 28 engages the flange 98.

Downstream Portion

In a preferred embodiment and as will be discussed in greater detail below, the downstream portion 74 includes a generally laterally extending plate 102 and a generally circumferentially extending sidewall 104 extending generally upwardly from the plate 102.

Furthermore, the downstream portion 74 preferably defines a downwardly open discharge opening 106 of the valve assembly 58. The discharge opening 106 is preferably configured to discharge liquid at least principally in a downward direction into the tank 10.

More particularly, the downstream portion 74 preferably includes a spoked structure 108 disposed axially below the plate 102. Preferably, the spoked structure 108 includes an inner ring 110, an outer ring 112, and a plurality of laterally extending arms 114 extending between and interconnecting the inner ring 110 and the outer ring 112. Furthermore, a plurality of axially extending risers 116 corresponding to the arms 114 preferably extend between and interconnect respective ones of the arms 114 with the plate 102.

The arms 114 preferably cooperate with the inner and outer rings 110 and 112 to define the discharge opening 106. More particularly, the arms 114 preferably section the discharge opening 106 into a plurality of discharge apertures 118. That is, each pair of adjacent arms 114 preferably cooperates with intermediate regions of the inner and outer rings 110 and 112 to define a discharge aperture 118, with the discharge apertures 118 collectively forming the discharge opening 106.

Preferably, three (3) discharge apertures 118 are defined, although more or fewer apertures may be present without departing from the scope of the present invention. Furthermore, the discharge opening might alternatively be continuous (i.e., not sectioned into discrete apertures).

The discharge apertures 118 are preferably each identically sized, identically shaped, and evenly arcuately spaced apart such that the discharge opening 106 presents rotational symmetry. Irregularities in size, shape, and/or spacing of the apertures are permissible according to some aspects of the present invention.

With further regard to the discharge opening 106 in a broad sense, it is particularly noted that the discharge opening 106 is "downwardly open" in the sense that liquid flows therethrough in a generally axial direction and from a more upstream location to a more downstream location.

Furthermore, axial flow therethrough is preferably unobstructed or at least substantially so. Such flow (including the above-described axial, downward, and at least substantially unobstructed characteristics) is preferably achieved by the use of opening-defining structure (such as the above-described spoked structure 108) that extends transverse to the axis and thus defines the opening along a radial or lateral plane.

Furthermore, although liquid discharged laterally or radially outwardly through laterally or radially oriented openings (e.g., as might be defined through an axially extending structure) might ultimately flow or fall in a downward direction due to gravity, liquid leaving the discharge opening of the present invention is preferably directly guided downwardly by the discharge opening. That is, the liquid flows or falls downwardly inherently due to the geometry and orientation of the discharge opening and does so immediately upon exiting the opening. Alternatively stated, a change of direction to achieve the desired downward flow is not necessary.

It is particularly noted that a "valve assembly" with respect to the present invention should be understood to be any mechanism that controls liquid flow, defines the discharge opening, and intercommunicates the two. In the preferred embodiment described herein, such requirements are cooperatively met by the hollow valve body 68 and the piston 70 (or, more specifically, the upstream portion 72, the downstream portion 74, the outer shell 76, and the piston 70). However, in alternative embodiments, alternative and/or additional structure might be provided that, by merit of its functionality, should be understood to be part of an alternatively configured valve assembly. That is, the principles of the present invention apply to alternative valve assemblies in which the structure defining the discharge opening is spaced from the actuating components of the valve (e.g., the piston) by alternative and/or additional intervening structure.

The plate 102, the outer ring 112, and each pair of adjacent arms 114 preferably cooperatively define a radial slot 120 therebetween, with each of the radial slots 120 being in immediate fluid communication with a corresponding one of the discharge apertures 118.

Similarly to the discharge apertures 118, the slots 120 are preferably each identically sized, identically shaped, and evenly arcuately spaced apart, although irregularities in size, shape, and/or spacing of the slots are permissible according to some aspects of the present invention.

As will be discussed in greater detail below, the plate 102 and the inner ring 110 preferably cooperatively define a generally axially extending outflow orifice 122.

The downstream portion 74 and the outer shell 28 are preferably threadably interconnected. More particularly, the outer ring 112 is preferably externally threaded to define a downstream portion externally threaded region 124. The outer shell 28 preferably includes a shell lower internally threaded region 126 that at least substantially circumscribes and threadably engages the downstream portion externally threaded region 124 so as to fix the downstream portion 74 relative to the shell 28.

Preferably, the downstream portion externally threaded region 124 includes upper and lower threaded portions 124a and 124b. The upper threaded portion 124a threadably engages the shell lower internally threaded region 126. The lower threaded portion 124b, however, preferably threadably engages the drop tube 66.

More particularly, the drop tube 66 preferably includes an upper internally threaded bore 128 that at least substantially circumscribes and threadably engages the lower threaded portion 124b. Furthermore, as best shown in FIG. 5, the drop tube 66 preferably presents a circumferentially extending shoulder 130 that abuts a lower margin 132 of the downstream portion 74 to axially position the downstream portion 74 relative to the drop tube 66. A lower face 134 of the outer shell 28 preferably abuts an upper face 136 of the drop tube 66, as well, such that the shoulder 130 effectively axially positions the downstream portion 74 relative to the outer shell 28.

Drop Tube

The drop tube 66 preferably extends generally axially downwardly into the tank 10 and defines a portion of the tank interior 18 as a whole. More particularly, the tank interior 18 preferably includes a drop tube portion 138 internal to the drop tube 66 and a remaining portion 140 external to the drop tube 66.

The drop tube 66 further preferably defines a plurality of bleed holes 142 configured to minimize pressure imbalances between the drop tube portion 138 of the tank interior 18 and the remaining portion 140 of the tank interior 18. The bleed holes 142 preferably aid in preventing a detrimental straw or suction-type effect within the drop tube 66. It is permissible, however, for such holes to be omitted.

The drop tube 66 is also preferably additionally operable to reduce foaming in a manner known to those of ordinary skill in the art.

As will be discussed in greater detail below, the drop tube 66 preferably at least substantially circumscribes the pilot tube 60, the float 62, and the flow diverter 64.

Furthermore, although a variety of drop tube sizes (both nominal and relative to the tank 10) and positions are permissible, in a preferred embodiment, the drop tube 66 extends to within about six inches (6") of the bottom wall 14 of the tank.

Piston

In a preferred embodiment, as noted previously, the valve assembly 58 includes the piston 70. The piston 70 is preferably continuously shiftable between an open valve position, shown in FIGS. 2 and 3, and a closed valve position, shown in FIGS. 4-5a. As will be discussed in greater detail below, the piston 70 permits flow of liquid past the valve inlet 92 when in the open valve position but in part restricts (and more preferably prevents) such flow when in the closed valve position.

The piston 70 preferably includes a generally laterally extending piston head 144 and a circumferential piston skirt 146 extending generally downwardly from the piston head 144 to define a piston hollow 148. As will be discussed in greater detail below, the piston head 144 preferably includes a laterally outwardly projecting sealing rim 150.

In a preferred embodiment, the upstream portion 72 presents a valve seat 152 for seating the piston 70 when the piston is in the closed valve position. Preferably, the valve seat 152 is disposed axially between the inlet 92 and the discharge opening 106.

Figure 5A:
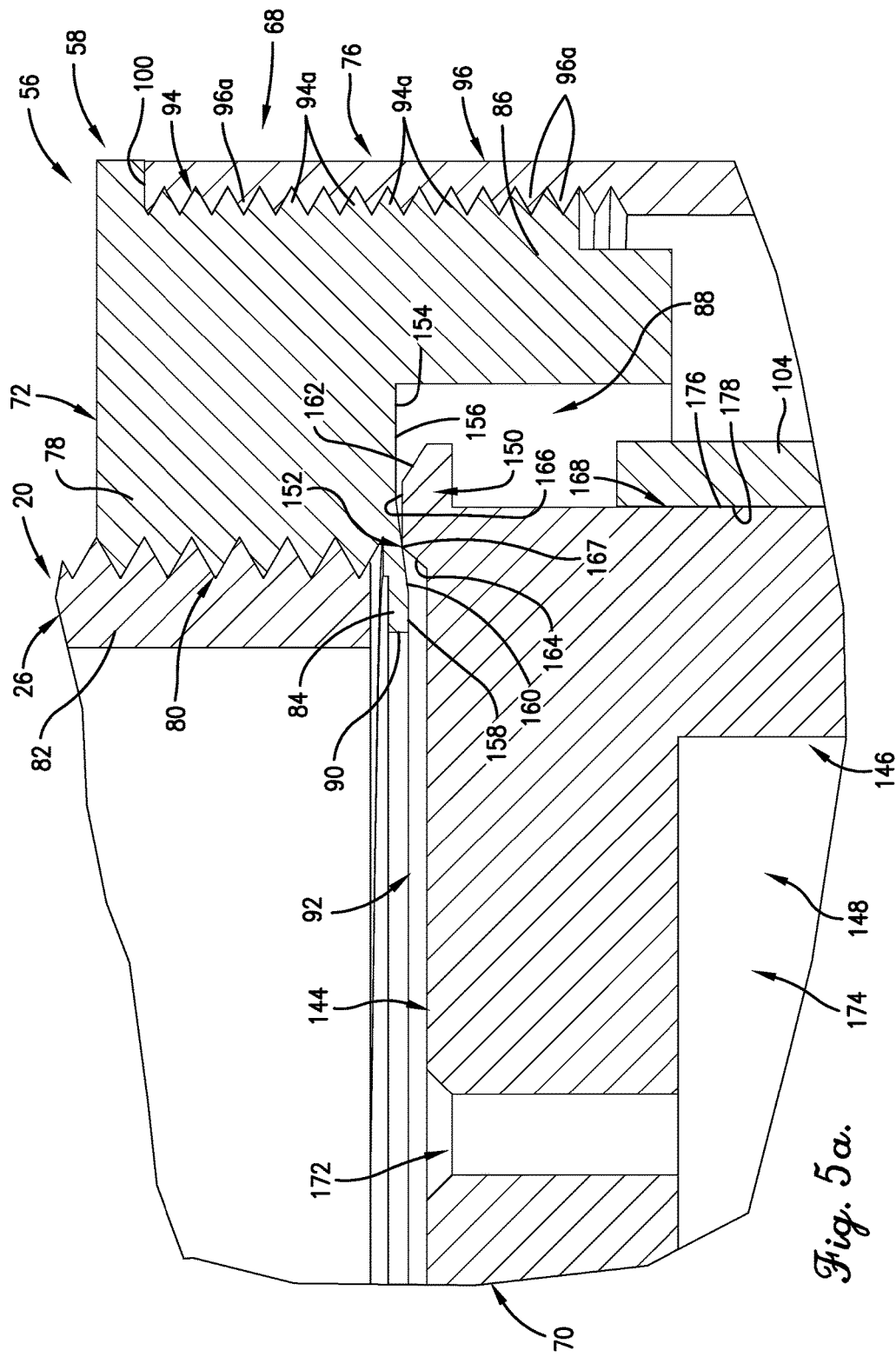
FIG. 5a is a greatly enlarged front cross-sectional view of a portion of the overfill prevention system of FIGS. 1-5, particularly illustrating the engagement of the piston and the valve seat when the piston is in the closed valve position.
Figure 6:
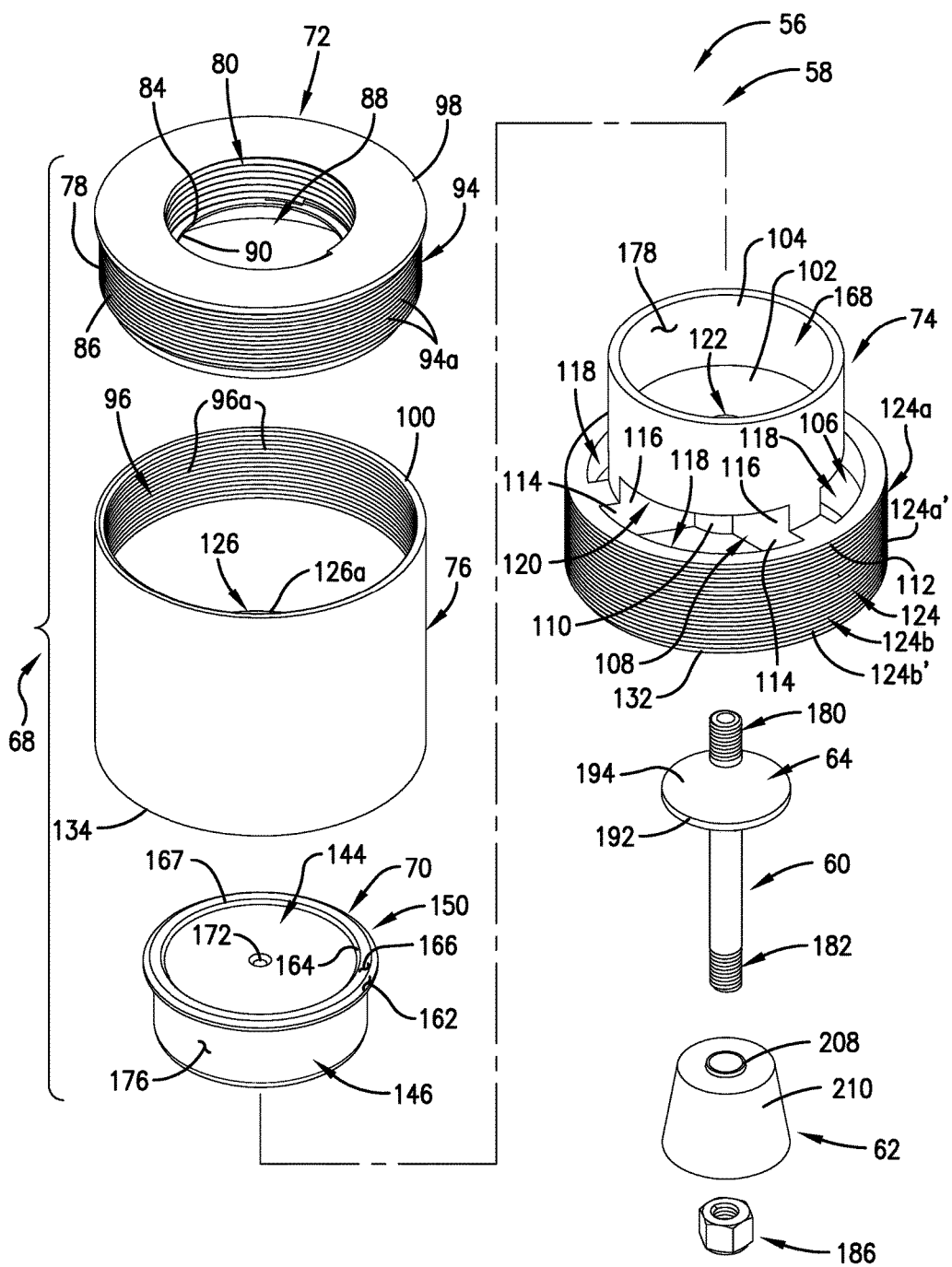
Figure 7:
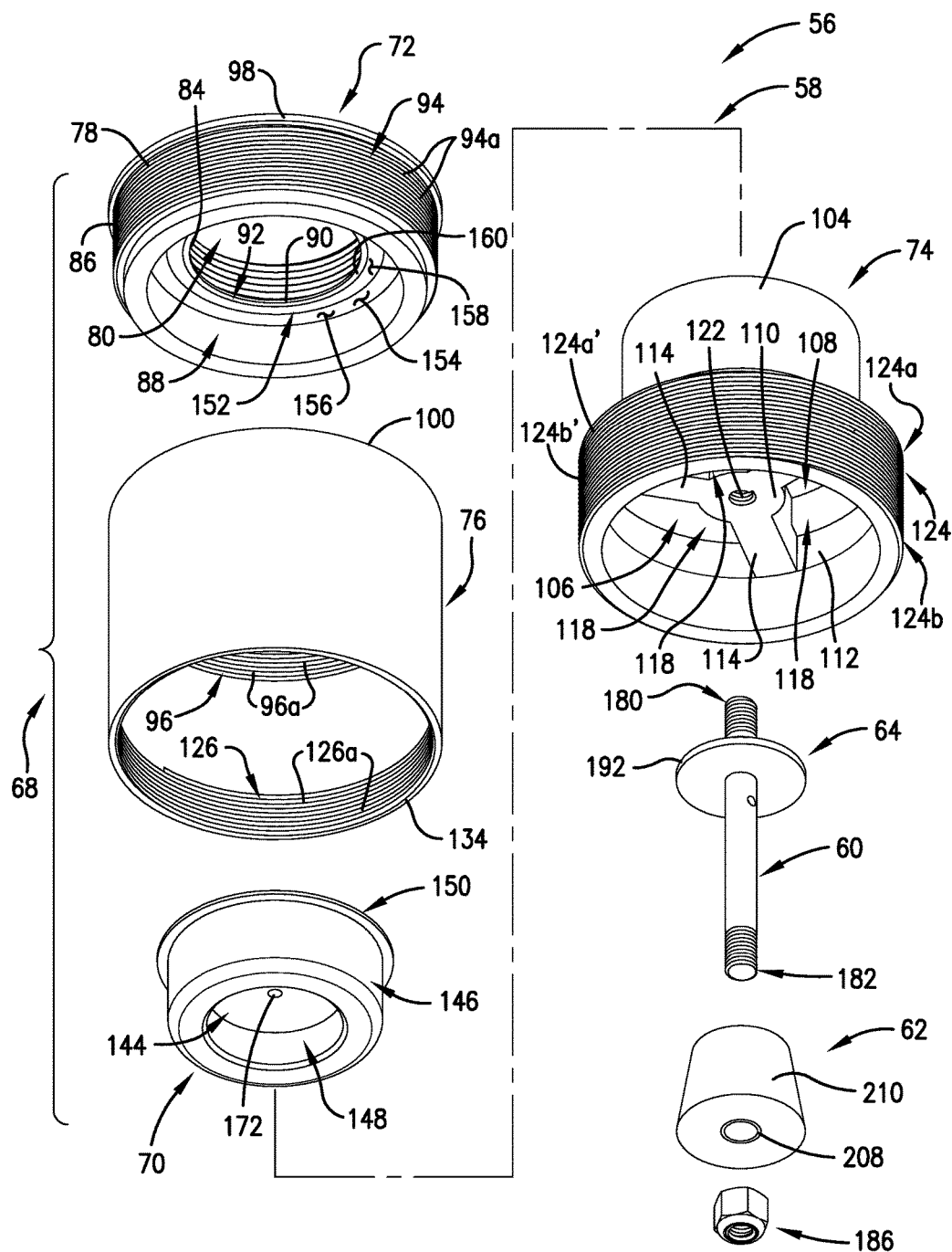
FIG. 7 is an exploded bottom perspective view of the overfill prevention system of FIGS. 1-6.

More particularly, as best shown in FIG. 5a, the main body 78 and the shelf 84 of the upstream portion 72 preferably cooperatively present a lower face 154 including a generally laterally extending outer annular face 156, a generally laterally extending inner annular face 158 spaced inwardly from the outer annular face 156, and a sloped intermediate annular face 160 extending between and interconnecting the outer and inner annular faces 156 and 158, respectively. The sloped intermediate annular face 160 preferably defines the valve seat 152.

The sealing rim 150 of the piston 70 preferably abuts the intermediate annular face 160 (i.e., the valve seat 152) when the piston 70 is in the closed valve position. More particularly, as best shown in FIG. 5a, the sealing rim 150 preferably includes a sloped outer annular face 162, a sloped inner annular face 164, and a generally laterally extending intermediate face 166 extending between and interconnecting the outer and inner annular faces 162 and 164, respectively. The outer and inner annular faces 162 and 164 are preferably sloped upwardly toward each other (i.e., as if to form an upwardly oriented triangle).

In still greater detail, a sealing edge 167 of the sealing rim 150 is defined at the interface between the inner annular face 162 and the intermediate face 166. The sealing edge 167 preferably engages the valve seat 152 to form a fluid-tight seal therewith when the piston 70 is in the closed valve position.

In a preferred embodiment, the sidewall 104 of the downstream portion 74 at least substantially circumscribes the piston skirt 146 (in both the open and closed valve positions). More particularly, the plate 102 and the sidewall 104 of the downstream portion 74 cooperatively define a piston-receiving well 168. When the piston 70 is in the open valve position, the piston-receiving well 168 receives the piston skirt 146 therein and at least substantially receives the piston head 144 therein. When the piston 70 is in the closed valve position, however, the piston head 144 is at least substantially received in the piston-accommodating space 88 of the upstream portion 72, while only the piston skirt 146 is received in the piston-receiving well 168. Thus, the piston-accommodating space 88 and the piston-receiving well 168 cooperatively define a piston envelope 170 that at least substantially contains the piston 70 in its entirety in both the open and closed valve positions, as well as in intermediate positions therebetween.

As will be discussed in greater detail below, the piston head 144 defines a generally axially extending inflow orifice 172 in fluid communication with the hollow 148.

Preferably, the piston 70 and the downstream portion 74 cooperatively define an expandable piston-actuating chamber 174. More particularly, when the piston 70 is in the open valve position (FIGS. 2 and 3), the piston head 144, the piston skirt 146, and the plate 102 of the downstream portion 74 cooperatively define the piston-actuating chamber 174, which is in its lowest-volume configuration. When the piston 70 is in the closed valve position (FIGS. 4-5a), the piston head 144, the piston skirt 146, the plate 102 of the downstream portion 74, and the sidewall 104 of the downstream portion 74 cooperatively define the piston-actuating chamber 174, which is in its largest-volume configuration.

In alternative terms, when the piston 70 is in the open valve position, the piston-actuating chamber 174 includes only the hollow 148. In the closed valve position, as well as in intermediate positions, the piston-actuating chamber 174 includes the hollow 148 and a portion of the piston-receiving well 168.

Preferably, the piston head 144 and the piston skirt 146 cooperatively present an outer circumferential piston face 176. The sidewall 104 of the downstream portion 74 preferably presents an inner circumferential sidewall face 178. The piston face 176 and the sidewall face 178 preferably slidably engage one another as the piston 70 shifts between open and closed valve positions.

In a preferred embodiment, the upstream portion 72, the outer shell 28, and the downstream portion 74 are connected in such a manner as to maintain a high degree of orthogonality and parallelism between one another. Such precise relationships aid in ensuring ease of shifting of the piston 70 within the piston-receiving envelope (or, more particularly, ease of sliding of the piston face 176 along the sidewall face 178). Furthermore, such precise relationships facilitate secure seating of the sealing edge 167 along the valve seat 152 when the piston 70 is in the closed valve position. That is, skewing of the piston 70 relative to the upstream portion 72 and consequent skewing of the sealing edge 167 relative to the valve seat 152 is at least substantially avoided.

Preferably, such precise orientation relationships are facilitated by the means of dual-start threads (also commonly referred to as double start threads or twin start threads). As will be readily apparent to one of ordinary skill in the art, each set of dual-start threads typically includes a pair of thread segments having angularly offset starting points so as to spiral about or encircle the threaded portion in parallel to one another. In the illustrated embodiment, the aforementioned upstream portion externally threaded region 94 and the shell upper internally threaded region 96 preferably include corresponding dual-start thread sets 94a and 96a, each including a pair of parallel thread segments having diametrically opposed starting points. Similarly, the upper threaded portion 124a of the downstream portion externally threaded region 124 and the lower shell lower internally threaded region 126 preferably include corresponding dual-start thread sets 124a' and 126a, each including a pair of parallel thread segments having diametrically opposed starting points. Alternative means of alignment and orientation, including other types of multi-start threads (e.g., quad-start threads) or means associated with conventional single-start threads are permissible, however.

Preferred Materials and Geometries

In a preferred embodiment, the valve assembly 58 and the drop tube 66 comprise an aluminum alloy such as aluminum alloy 6061-T6. Alternative or additional materials may be used, however, and materials may vary from one component of the valve assembly 58 to the next. Preferably, however, the materials present structural properties sufficient to withstand the associated fluid pressures to be discussed in greater detail below. Furthermore, the materials should be compatible with the liquid associated with the tank 10. Further still, the materials should have coefficients of thermal expansion that ensure proper sliding of the piston 70 is feasible at all operational temperatures of the tank 10.

Preferably, the valve assembly 58 as a whole is generally cylindrical in form to present generally circular lateral cross-sections. For instance, the outer shell 76, the skirt 86 of the upstream portion 72, the sidewall 104 of the downstream portion 74, the inner and outer rings 110 and 112 of the downstream portion 74, and the piston skirt 146 are preferably generally in the form of right circular cylinders or tubes. The main body 78 of the upstream portion 72, the plate 102 of the downstream portion 74, and the piston head 144 are at least substantially in the form of circular discs. The drop tube 66 is also preferably generally in the form of a right circular cylinder or tube. However, alternative or varying shapes are permissible. For instance, a generally square outer cross-sectional margin might be shared by several of the components, or the piston might be generally conical in form.

Pilot Tube, Flow Diverter, and Float

As noted previously, the overfill prevention system 56 further includes the pilot tube 60, the flow diverter 64, and the float 62.

Pilot Tube

The pilot tube 60 is preferably fixed relative to the downstream portion 74 of the valve assembly 58. More particularly, the pilot tube 60 is preferably fixed directly to the inner ring 110 of the downstream portion 74 and projects downwardly therefrom, although other fixation locations are permissible according to some aspects of the present invention.

As best shown in FIG. 5, the pilot tube 60 presents threaded upper and lower ends 180 and 182, respectively. The inner ring 110 preferably defines a threaded bore 184 that threadably receives the upper end 180, although other fixation means, including but not limited to welding, adhesives, discrete fasteners, and integral formation, fall within the scope of some aspects of the present invention.

As will be discussed in greater detail below, the lower end 182 preferably receives a nut 186.

Preferably, the pilot tube 60 extends at least substantially axially. The pilot tube 60 is also preferably at least substantially straight. It is permissible according to some aspects of the present invention, however, for some of all of the pilot tube to be angled relative to axial and/or for the pilot tube to include curves, bends, or other non-straight portions. Yet further, the pilot tube might in its entirety be non-straight in its extension. As will be apparent from the discussion below, however, the shape of the pilot tube is preferably such that the float is easily shiftable along at least a portion thereof in response to changes in the level of liquid within the tank 10.

The pilot tube 60 is preferably at least substantially centered relative to the discharge opening 106. That is, the discharge apertures are preferably evenly and symmetrically arranged around the pilot tube 60. Offset arrangements fall within the scope of some aspects of the present invention, however.

As will be discussed in greater detail below, the pilot tube 60 preferably defines an internal channel 188 in fluid communication with the outflow orifice 122 of the downstream portion 74. In keeping with the preferred overall configuration of the pilot tube 60, the internal channel 188 preferably extends at least substantially straight and axially, although variations are permissible according to some aspects of the present invention.

Preferably, the pilot tube 60 defines a closed end 189 such that the internal channel 188 comprises a blind hole.

Still further, the pilot tube 60 preferably defines a pair of discharge holes 190 spaced downwardly from the valve assembly 58 and in fluid communication with the internal channel 188 and the tank interior 18. That is, the discharge holes 190 intercommunicate the internal channel 188 and the tank interior 18. The discharge holes 190 are preferably diametrically opposed, although alternative hole arrangements are within the ambit of the present invention. Furthermore, although two (2) discharge holes 190 are preferred, as illustrated, it is permissible according to some aspects of the present invention for only a single discharge hole or more than two (2) discharge holes to be provided. In the latter case, it is preferred but not required that the holes be evenly arcuately spaced apart. The discharge holes 190 are preferably identically sized and shaped, although such geometrical coordination is not required for every aspect of the present invention. Still further, while the discharge holes are preferably laterally or radially oriented, angled holes may be provided without departing from the spirit of the present invention.

Preferably, the pilot tube 60 is at least substantially received within the drop tube portion 138 of the tank interior 18, such that fluid communication of the discharge holes 190 with the remaining portion 140 of the tank interior 18 is via the drop tube portion 138.

As will be discussed in greater detail below, the float 62 is preferably slidable along the pilot tube 60 between a continuum of open float positions in which the float exposes the discharge holes 190 and a continuum of closed float positions in which the float covers the discharge holes 190.

Flow Diverter

The flow diverter 64 is preferably disposed axially between the discharge opening 106 and the float 62 and extends generally laterally outwardly from the pilot tube 60. As will be discussed in greater detail below, the flow diverter 64 is configured to deflect liquid from the discharge opening 106 away from the float 62.

More particularly, in a preferred embodiment, the flow diverter 64 and the float 62 are at least substantially axially aligned. Furthermore, similarly to the pilot tube 60, the flow diverter 64 and the float 62 are at least substantially centered below and relative to the discharge opening 106 (i.e., with the discharge apertures being evenly and symmetrically distributed thereabout). Offsets of the flow diverter and the float relative to each other are permissible according to some aspects of the present invention, although preferably subject to functionality constraints discussed below. Offsets of the flow diverter and the float relative to the discharge opening 106 are similarly permissible according to some aspects of the present invention, while also being preferably subject to operational constraints described below.

The flow diverter 64 is preferable generally conical in form. More particularly, the flow diverter 64 preferably presents a disk-like base portion 192 and a generally conical main portion 194 above and integral with the base portion 192. The base portion 192 preferably presents a generally flat, axially extending outer face 196 and a generally flat, axially extending bottom face 198. The main portion 194 preferably presents a sloped deflection face 200 that angles upwardly and inwardly.

The main portion 194 preferably presents an upper or relatively upstream flow diverter end or margin 202 presenting a minimum lateral flow diverter dimension $D_{div\_min}$. The base portion 192 preferably presents a bottom or relatively downstream flow diverter end or margin 204 presenting a maximum lateral flow diverter dimension $D_{div\_max}$. It is noted that the downstream margin 204 is therefore also an outermost margin 206 of the flow diverter 64.

The flow diverter 64 preferably presents a series of circular lateral cross-sections, such that the minimum and maximum lateral flow diverter dimensions are diameters.

As will be discussed in greater detail below, the flow diverter geometry may vary from the above-described preferred configuration without departing from the scope of some aspects of the present invention.

Float

In a preferred embodiment, the float 62 includes a sleeve 208 at least substantially circumscribing the pilot tube 60 and a buoyant body 210 at least substantially circumscribing the sleeve 208. As will be discussed in greater detail below, the sleeve 208 preferably includes a spacer portion 212 projecting axially upwardly relative to the buoyant body 210.

The spacer portion 212 of the sleeve 208 preferably presents an upper (or relatively upstream) sleeve margin 214. The sleeve 208 preferably presents a lower (or relatively downstream) sleeve margin 216. The buoyant body 210 preferably presents upper and lower (or relatively upstream and relatively downstream) buoyant body margins 218 and 220. The upper buoyant body margin 218 is preferably likewise an upper float margin 222 of the float 62, excluding the spacer portion 212. The lower sleeve margin 216 and the lower buoyant body margin 220 are preferably aligned, such that the sleeve 208 and the buoyant body 210 cooperatively present a lower float margin 224 of the float 62.

The float 62 is preferably generally frustoconical in shape. More particularly, the buoyant body 210 presents a generally flat, axially extending top face 226; a generally flat, axially extending bottom face 228; and a sloped sidewall 230 that angles inwardly and upwardly to interconnect the top and bottom faces 226 and 228.

Thus, the float 62 preferably includes an upper or relatively upstream float end 232 at the upper float margin 222 that presents a minimum lateral float dimension $D_{float\_min}$. The float 62 preferably includes a lower or relatively downstream float end 234 at the lower float margin 224 that presents a maximum lateral float dimension $D_{div\_max}$ (such lower float margin 224 therefore also being an outermost margin 240 of the float 62.)

The float 62 preferably presents a series of circular lateral cross-sections, such that the minimum and maximum lateral float dimensions are diameters.

As will be discussed in greater detail below, the float geometry may vary from the above-described preferred configuration without departing from the scope of some aspects of the present invention.

Relative Geometries of Flow Diverter and Float

Preferably, the maximum flow diverter lateral dimension is $D_{div\_max}$ is at least substantially equal to or larger than the maximum float lateral dimension $D_{float\_max}$ such that the flower diverter 64 effectively acts as an umbrella over the flow diverter 64. For instance, in a preferred embodiment, the maximum flow diverter lateral dimension is between about one hundred percent (100%) and about one hundred fifty percent (150%) of the maximum float lateral dimension. In the illustrated embodiment, for instance, the maximum flow diverter lateral dimension $D_{div\_max}$ is about one and fifty-one hundredths inches (1.51"). The maximum float lateral dimension $D_{float\_max}$ is about one and fifty hundredths inches (1.50").

As will be discussed in greater detail below with regard to certain features and as noted briefly above, a variety of shapes of both the flow diverter and the float are permissible without departing from some aspects of the present invention. For instance, the float sidewall might not be sloped, or the flow diverter might not have a flat bottom wall. In such instances, it is noteworthy that the maximum and minimum dimensions discussed above might be associated with alternative portions of the float and/or the flow diverter. For instance, the respective maximum dimensions might be associated with upstream ends of the float and flow diverter rather than downstream ends, as illustrated, or the maximum dimensions might be associated with intermediate regions thereof. Ultimately, however, it is preferred that the above-described relative relationship between the maximum float and flow diverter dimensions is present regardless of the specific float and flow diverter geometries.

Preferably, as noted above, both the flow diverter 64 and the float 62 present exclusively circular lateral cross-sections. Based on the above-described preferred dimensional relationship, it will be readily apparent to one of ordinary skill in the art that is also preferred for the outermost flow diverter margin 206 in its entirety to be disposed laterally outside the outermost float margin 236 in its entirety. Such a condition is also preferred in alternative embodiments in which the cross-sectional shapes of the flow diverter and float vary. For instance, should the flow diverter maintain its preferred form as described above but the float be generally cuboidal in form, it is preferred that the largest circular cross-section of the flow diverter being able to circumscribe the largest rectangular cross-section of the float.

In general, however, it is preferred that the flow diverter and float lateral cross-sections be similarly shaped and oriented (i.e., rotated to correspond with each other).

Preferred Materials and Geometries

In a preferred embodiment, the pilot tube 60, the flow diverter 64, and the sleeve 208 of the float 62 comprise an aluminum alloy such as aluminum alloy 6061-T6. Alternative or additional materials may be used, however, and materials may vary from one component to the next. Preferably, however, the materials present structural properties sufficient to withstand the associated fluid pressures to be discussed in greater detail below. Furthermore, the materials should be compatible with the liquid associated with the tank 10. Further still, the materials should have coefficients of thermal expansion that ensure proper sliding of the float 62 is feasible at all operational temperatures of the tank 10.

In a preferred embodiment, the buoyant body 210 comprises a polyurethane foam. However, any material compatible with the liquid associated with the tank 10 and sufficiently buoyant relative to the liquid may be used.

Operation of the Overfill Prevention System

In a preferred method of operation, a tank truck (not shown) transports a desired liquid to a location adjacent the tank 10. A hose (not shown) extends from the truck to the source coupler 22. A pump (not shown) mounted to the truck pumps liquid out of the truck to the source coupler 22 via the hose. The pressurized liquid flows through the source coupler 22 and down the inlet extension tube 26 to the valve assembly inlet 92.

Preferably, as will be understood by one of ordinary skill art, the liquid is pumped in at a relatively high pressure and a relatively high flow rate. Among other things, such characteristics of the flow enable efficient filling of the tank 10.

Figure 2:
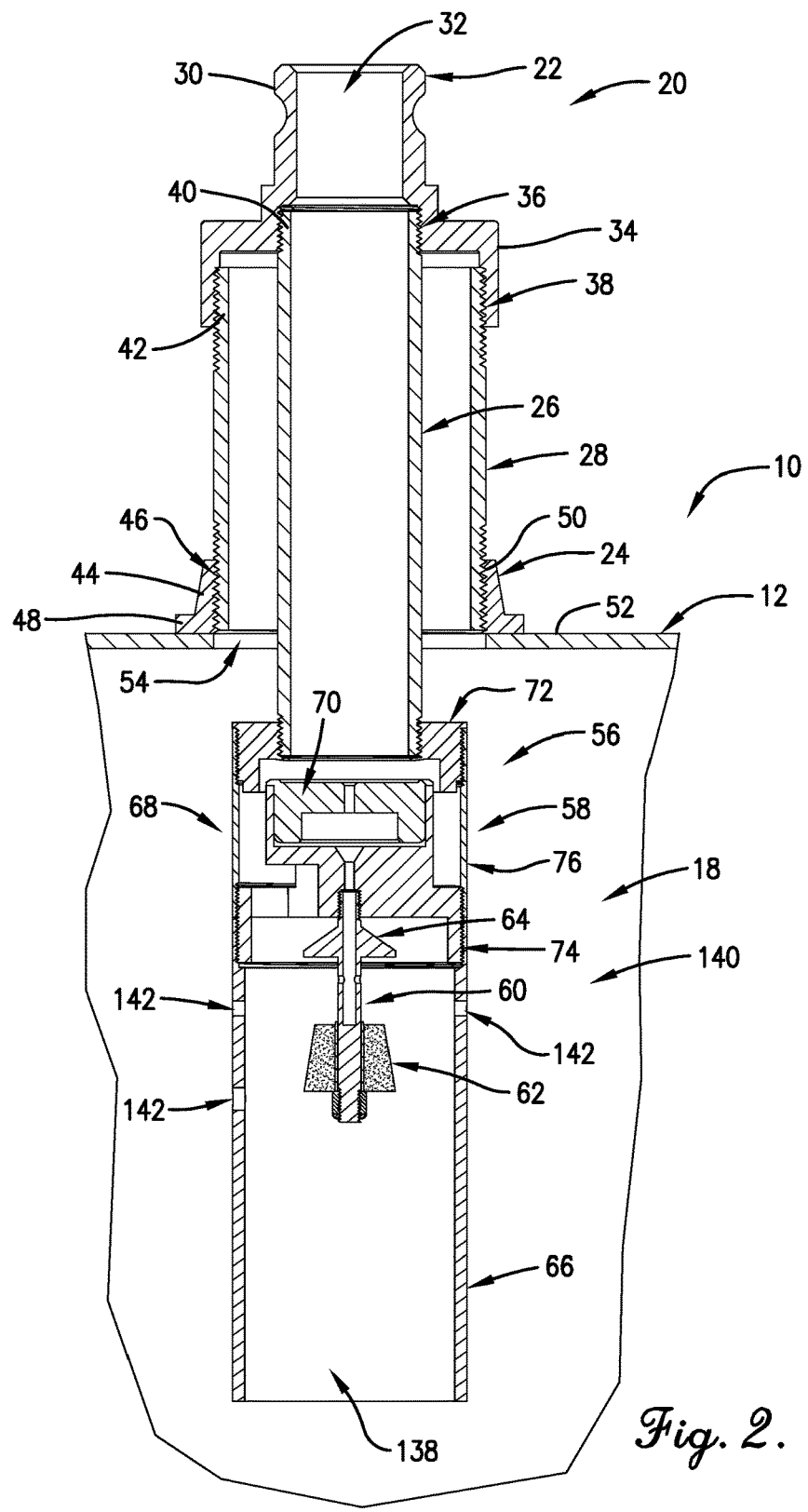
FIG. 2 is a fragmentary front cross-sectional view of a portion of the tank of FIG. 1, particularly illustrating the float in the lowermost open float position and the piston in the open valve position.

As shown in FIG. 2, the piston 70 is preferably initially in the open valve position. Furthermore, the float 62 is preferably initially in a lowermost open position in which the float 62 engages the nut 186, which thereby acts as a lower limit stop.

Preferably, in order to most effectively function as a limit stop, the nut 186 is a locking nut such as a nylon locking nut. However, other nut types or means of locking the nut may be provided. Furthermore, an entirely different structure might be provided to act as a limit stop. It is preferable, however, for such structure to be removable from the piston tube to facilitate assembly of the float thereon.

A primary flow of the liquid flows through the valve assembly inlet 92 into the valve body 68. More particularly, the primary flow of liquid flows generally axially downwardly through the inlet 92 into the piston-accommodating space 88, then generally laterally outwardly along the piston head 144 through the piston-accommodating space 88, then generally axially downwardly around the sealing rim 150 and between the outer shell 28 and the sidewall 104 of the downstream portion 74, then generally laterally inwardly through the slots 120, and thereafter generally axially downwardly through the discharge apertures 118 of the discharge opening 106.

An outer portion of the liquid directed or falling generally downwardly falls laterally outside of the flow diverter 64 into the drop tube portion 138 of the tank interior 18. An inner portion of the liquid, however, might fall onto the flow diverter 64. This inner portion of liquid is preferably diverted away from the float 62 by the flow diverter 64 due to the above-described geometries of the flow diverter 64 and the float 62. More particularly, the sloped deflection face 200 of the main portion 194 preferably directs liquid incident thereon laterally outwardly and over or past the outer face 196 of the base portion 192, such that the liquid thereafter falls laterally outside the outermost margin 236 of the float 62.

It is particularly noted that, under ideal conditions (i.e., conditions producing perfect laminar flow of the liquid), none of the liquid falls onto the flow diverter. That is, the above-described outer portion of the liquid ideally includes the entirety of the liquid exiting the discharge opening. In such a case, the flow diverter is unnecessary, since no liquid is directed or falling toward to the float. Such ideal conditions are unlikely however, with at least a small portion of the liquid requiring diversion away from the float.

Both the outer and inner portions of liquid initially flow through and out of the drop tube portion 138 of the tank interior 18 into the remaining portion 140 of the tank interior 18 or, if the liquid level is high enough to have risen sufficiently into the drop tube 66, flow into the drop tube 66 only or into both the drop tube 66 and the remaining portion 140 of the tank interior 18. As will be apparent to one of ordinary skill in the art, the particular flow paths in the latter instances will vary according to a variety of factors, including but not limited to the fluid inflow pressure, the tank and drop tube geometries, etc.

Simultaneously with the above-described primary flow, a secondary or pilot flow of liquid is preferably diverted from incoming liquid as it flows through the piston-accommodating space 88. More particularly, when the piston 70 is in the open valve position, a pilot flow of the liquid flows through the valve assembly inlet 92 and the piston-accommodating space 88 into the inflow orifice of the piston 70.

When the liquid in the tank 10 is below the predetermined level (and the float 62 thus leaves the discharge holes 190 of the pilot tube 60 unobstructed), the pilot flow at least substantially continues through the piston-actuating chamber 174, out the outflow orifice 122 defined in the downstream portion 74, through the internal channel 188 of the pilot tube 60, and out the discharge holes 190. As described above with regard to the primary flow, the pilot liquid then either remains in the drop tube portion 138 of the tank interior 18 or continues into the remaining portion 140 of the tank interior 18.

Although the pilot flow at least substantially follows the flow path described above, it is noted that some of the pilot flow might instead remain in upstream portions of the path, including within the piston-actuating chamber 174.

Figure 3:
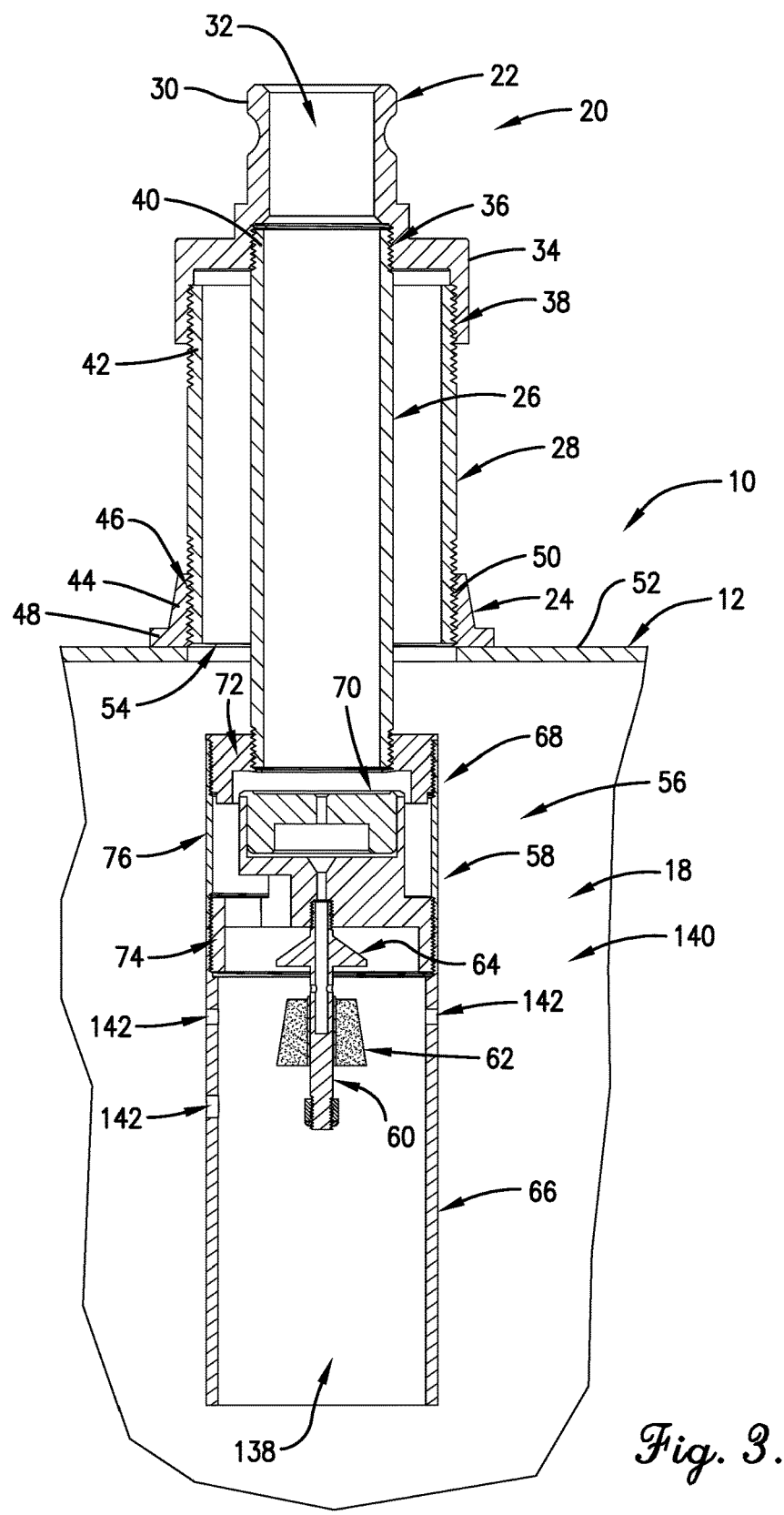
FIG. 3 is a fragmentary front cross-sectional view of the portion of the tank shown in FIG. 2, particularly illustrating the float in an intermediate open float position and the piston in the open valve position.

As the liquid level in the tank 10 rises, the float 62 is buoyantly shifted axially upwardly along the pilot tube through a continuum of (non-discrete) intermediate open positions, one of which is shown in FIG. 3. It is particularly noted that, in such intermediate open positions, the float 62 has been elevated away from the nut 186 but not so much as to cover the discharge holes 190.

The above-described preferred operational aspects of the present invention are associated with conditions in which (1) the piston 70 is in the open valve position, in which it is spaced from the valve seat 152 and resting on the sidewall 104 of the downstream portion 74 of the valve body 68, and (2) the liquid level in the tank 10 is below a predetermined level such that the float 62 is in an open float position and the discharge holes 190 are exposed. The preferred flow pattern changes, however, when the liquid level in the tank 10 reaches the predetermined level.

Figure 4:
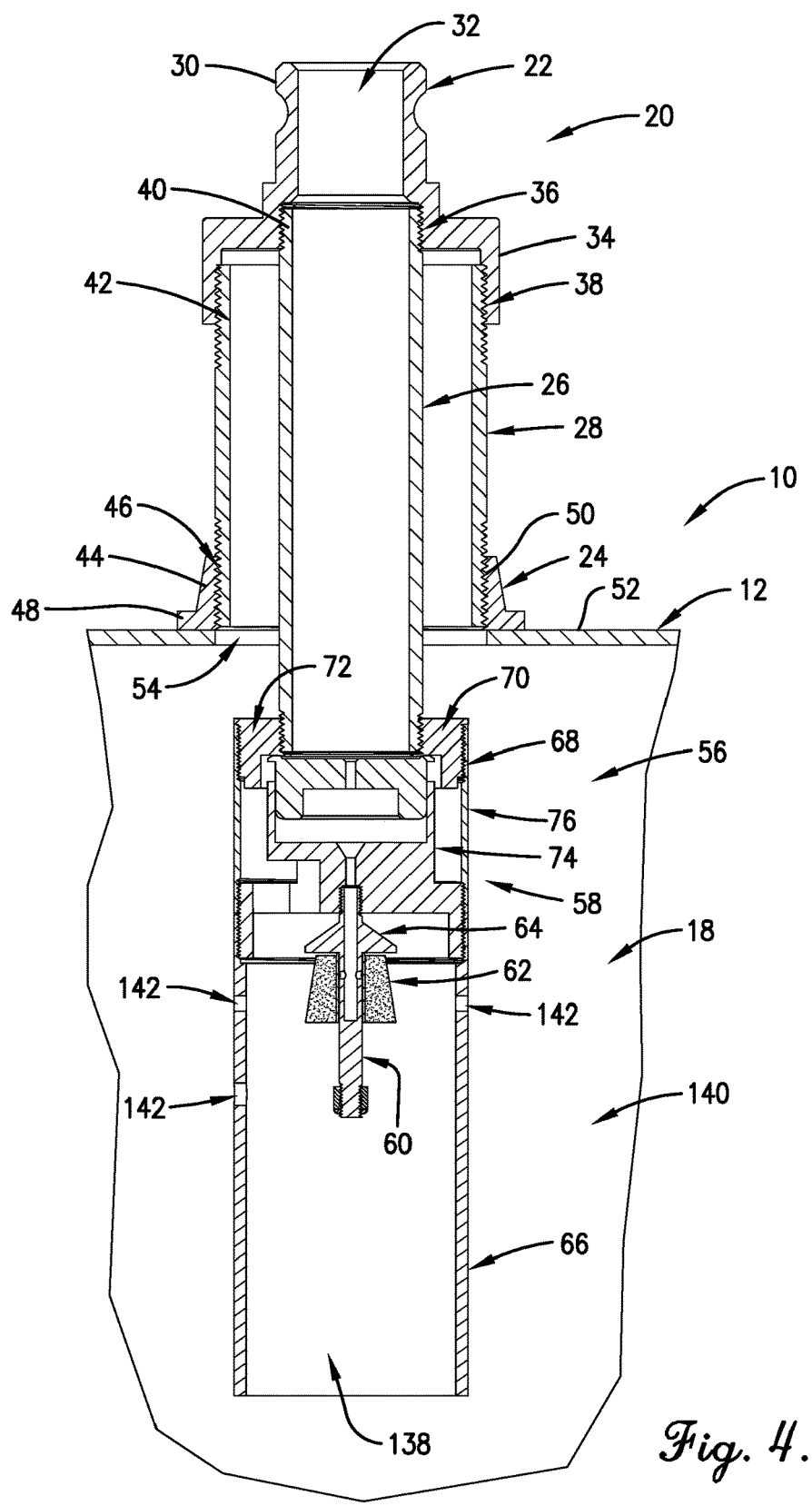
FIG. 4 is a fragmentary front cross-sectional view of the portion of the tank shown in FIGS. 2 and 3, particularly illustrating the float in the uppermost closed float position and the piston in the closed valve position.

More particularly, when the liquid level in the tank 10 reaches the predetermined level, the float 62 is buoyantly elevated by the liquid into a closed float position covering the discharge holes and restricting outflow of the pilot liquid through said discharge holes. For instance, FIGS. 4-5a illustrate an uppermost closed position of the float 62, in which the liquid level in the tank has risen sufficiently to shift the float 62 to completely cover the discharge holes 190 and to shift the spacer portion 212 of the float 62 into engagement with the flow diverter 64 (which consequently acts as an upper limit stop that limits further upward shifting of the float 62).

It is particularly noted that the spacer portion 212 of the sleeve 208 engages the bottom face 198 of the flow diverter 64 while ensuring that the buoyant body 210 is axially spaced from the flow diverter 64. Such spacing is preferred to eliminate "sticking" of the buoyant body 210 to the flow diverter 64 due to van der Waals' forces. The spacer portion 212 may be eliminated without departing from some aspects of the present invention, however. Furthermore, although the flat bottom face 198 presents a preferred surface for engagement with the spacer portion 212, alternative flow diverter designs may also provide suitable limiting features.

Initially, in the closed-float, open valve scenario described above, the primary flow of liquid may continue to flow as discussed above. However, the pilot liquid no longer has an "escape route" into the tank interior 18 via the discharge holes 190. Instead, as pilot liquid continues to flow into the inflow orifice 172 of the piston head 144, it begins to fill first the internal channel 188 and then the piston-actuating chamber 174. With no liquid escape route available, increasing fluid pressure in the piston-actuating chamber 174, as pilot liquid inflow continues, results in expansion of the piston-actuating chamber 174 and associated axially upward shifting of the piston 70. That is, roughly speaking, the upward forces on the piston 70 due to fluid pressure within the piston-actuating chamber 174 overcome the downward forces on the piston 70 provided by the inflowing liquid incident on the piston head 144, friction with the sidewall 104 of the downstream portion 74, and gravity. Such lifting and expansion preferably continues until the piston 70 sealingly engages the valve seat 152 (i.e, shifts into the closed valve position), restricting continued primary flow and, in turn, overfilling of the tank 10. More particularly, the sealing edge 167 of the sealing rim 150 engages the valve seat 152.

It is particularly noted that in addition to the mechanical seal cooperatively provided by the sealing edge 167 and the valve seat 152, secondary restriction of continued inflow is provided by the tortuous path cooperatively defined by the shelf 84 of the upstream portion 72; the annular faces 158, 160, and 162 of the lower face 154 of the upstream portion 72; and the annular faces 162, 164, and 166 of the sealing rim 150.

Preferably, due at least in part to the relatively small volume of the piston-actuating chamber 174 (even it its expanded form) and the relatively high liquid inflow rates and pressures, shifting of the piston 70 from the open valve position to the closed valve position upon the liquid in the tank 10 reaching the predetermined level and the float 62 covering the discharge holes 190 is near instantaneous. That is, although a small amount of liquid from the primary flow will bypass the valve seat 152 after the discharge holes 190 have been covered, such amount is preferably negligible. Thus, the liquid level in the tank 10 will only slightly exceed the predetermined level.

As will be apparent to one of ordinary skill in the art, stoppage of the primary inflow by the shifted piston 70 will result in fluid back pressure that is transmitted upstream through the inlet extension tube 26. Such back pressure is preferably sensed by a sensor (not shown) operably connected to a control system that subsequently shuts off the pump. Such shut off may alternatively be manually initiated (e.g., by an operator). Yet further, other means of indicating pump shutoff needs may be provided in addition to or in lieu of a pressure sensor.

It is particularly noted that the present invention preferably results in a stoppage of inflow into the tank 10 prior to shut-off of the pump, thus enabling a quicker response to the predetermined fill level being reached.

It is also noted that the desired predetermined fill level will vary according to a variety of factors, including but not limited to the inflow rate and pressure, the tank dimensions, and the type of liquid. The predetermined fill level as implemented will be apparent based on the vertical positioning of the discharge holes 190 relative within the tank interior 18. In the illustrated embodiment, the predetermined fill level is preferably less than about two inches (2") from the top wall 12 of the tank 10.

Upon stoppage of liquid inflow, the pressurized liquid in the piston-actuating chamber 174 preferably bleeds upwardly out of the chamber 174 through the inflow orifice 172 of the piston head, releasing pressure from the chamber 174 and enabling the piston 70 to gradually return to the open valve condition. That is, a desirably full tank 10 and an equilibrium state of the liquid and the valve assembly 58 are achieved.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An overfill prevention system for use with a liquid storage tank, said system comprising:
    a valve assembly defining a downwardly open discharge opening configured to discharge liquid at least principally in a downward direction;
    a pilot tube fixed relative to and projecting downwardly relative to the valve assembly,
    said pilot tube defining an internal channel in fluid communication with the valve assembly,
    said pilot tube further defining a discharge hole spaced downwardly from the valve assembly and in fluid communication with the internal channel and the tank;
    a float buoyantly shiftable along the pilot tube between an open position in which the float exposes the discharge hole when liquid within the tank is below a predetermined level and a closed position in which the float covers the discharge hole when liquid within the tank reaches or exceeds the predetermined level; and
    a flow diverter disposed between the discharge opening and the float,
    said flow diverter configured to deflect liquid from the discharge opening away from the float,
    said float engaging the flow diverter when the float is in the closed position, with the flow diverter limiting further upward shifting of the float.

2. The system of claim 1,
    said flow diverter extending generally laterally outwardly from the pilot tube.

3. The system of claim 2,
    said flow diverter presenting a maximum flow diverter lateral dimension that is at least substantially equal to or larger than a maximum float lateral dimension.

4. The system of claim 3,
    said maximum flow diverter lateral dimension being between about 100% and about 150% of the maximum float lateral dimension.

5. The valve assembly as claim 3,
    said maximum flow diverter lateral dimension being defined at a bottom margin of the flow diverter,
    said maximum float lateral dimension being defined at a bottom margin of the float.

6. The valve assembly of claim 2,
    said flow diverter defining an outermost flow diverter margin,
    said float defining an outermost float margin,
    an entirety of the outermost flow diverter margin being disposed laterally outside an entirety of the outermost float margin.

7. The system of claim 2,
    said flow diverter presenting a lateral flow diverter cross-section that is similarly shaped and similarly oriented to a lateral float cross-section.

8. The system of claim 7,
    said flow diverter cross-section and said float cross-section presenting maximum lateral flow diverter and float dimensions, respectively.

9. The system of claim 7,
    said flow diverter cross-section and said float cross-section each being generally circular.

10. The system of claim 9,
    said flow diverter being generally conical in shape,
    said float being generally frustoconical in shape.

11. The system of claim 10,
    said flow diverter defining a radially smaller upstream flow diverter end and a radially larger downstream flow diverter end,
    said float defining a radially smaller upstream float end and a radially larger downstream float end.

12. The system of claim 1,
    said float including—
        a sleeve at least substantially circumscribing the pilot tube, and
        a buoyant body at least substantially circumscribing the sleeve,
        said sleeve extending upwardly relative to the buoyant body such that the sleeve engages the flow diverter and the buoyant body is spaced from the flow diverter when the float is in the closed position.

13. The system of claim 1,
    said discharge opening being sectioned into a plurality of apertures.

14. The system of claim 1, said valve assembly comprising:
    a hollow valve body including—
        an upstream portion defining an inlet configured to receive pressurized liquid for filling of the tank,
        a downstream portion spaced axially from the upstream portion and defining the discharge opening, and
        a valve seat disposed axially between the inlet and the discharge opening;
    a piston axially shiftable within the valve body between an open valve position and a closed valve position,
    said piston being axially spaced from the valve seat in the open valve position so as to enable flow of liquid through the inlet, past the valve seat, through the valve body, through the discharge opening, and into the tank,
    said piston sealingly engaging the valve seat in the closed valve position so as to restrict flow of liquid past the valve seat, through the valve body, through the discharge opening, and into the tank.

15. The system of claim 14,
    said piston and said downstream portion cooperatively defining an expandable piston-actuating chamber,
    said piston defining an inflow orifice fluidly interconnecting the inlet and the piston-actuating chamber, such that the piston-actuating chamber is configured to receive a pilot flow of the liquid,
    said downstream portion defining an outflow orifice fluidly interconnecting the piston-actuating chamber and the internal channel, such that the internal channel is configured to receive the pilot flow, with pilot liquid flowing from the piston-actuating chamber to the tank via the internal channel and the discharge hole when the float is in the open position,
    said float configured to restrict flow of pilot liquid from the piston-actuating chamber to the tank via the internal channel and the discharge hole when in the closed position.

16. The system of claim 15,
    said valve being configured such that pilot liquid pressure increases in the piston-actuating chamber when the float is in the closed position, whereby the piston shifts from the open position to the closed position.

17. The system of claim 15,
    said downstream portion including a generally laterally extending plate and a sidewall extending generally upwardly from the plate,
    said plate, said sidewall, and said piston cooperatively defining the piston-actuating chamber.

18. The system of claim 17,
    said piston presenting a generally laterally extending head and a circumferential skirt extending generally downwardly from the head,
    said sidewall circumscribing the skirt.

19. The system of claim 1,
said pilot tube extending at least substantially axially from the valve assembly.
20. The system of claim 1,
said pilot tube being at least substantially straight.
21. The system of claim 1,
said pilot being at least substantially centered relative to the discharge opening.
22. An overfill prevention system for use with a liquid storage tank, said system comprising:
  a valve assembly defining a downwardly open discharge opening configured to discharge liquid at least principally in a downward direction;
  a pilot tube fixed relative to and projecting downwardly relative to the valve assembly,
  said pilot tube defining an internal channel in fluid communication with the valve assembly,
  said pilot tube further defining a discharge hole spaced downwardly from the valve assembly and in fluid communication with the internal channel and the tank;
  a float buoyantly shiftable along the pilot tube between an open position in which the float exposes the discharge hole when liquid within the tank is below a predetermined level and a closed position in which the float covers the discharge hole when liquid within the tank reaches or exceeds the predetermined level; and
  a flow diverter disposed between the discharge opening and the float,
  said flow diverter configured to deflect liquid from the discharge opening away from the float,
  said valve assembly comprising:
    a hollow valve body including—
      an upstream portion defining an inlet configured to receive pressurized liquid for filling of the tank,
      a downstream portion spaced axially from the upstream portion and defining the discharge opening, and
      a valve seat disposed axially between the inlet and the discharge opening;
    a piston axially shiftable within the valve body between an open valve position and a closed valve position,
    said piston being axially spaced from the valve seat in the open valve position so as to enable flow of liquid through the inlet, past the valve seat, through the valve body, through the discharge opening, and into the tank,
    said piston sealingly engaging the valve seat in the closed valve position so as to restrict flow of liquid past the valve seat, through the valve body, through the discharge opening, and into the tank,
    said piston and said downstream portion cooperatively defining an expandable piston-actuating chamber,
    said piston defining an inflow orifice fluidly interconnecting the inlet and the piston-actuating chamber, such that the piston-actuating chamber is configured to receive a pilot flow of the liquid,
    said downstream portion defining an outflow orifice fluidly interconnecting the piston-actuating chamber and the internal channel, such that the internal channel is configured to receive the pilot flow, with pilot liquid flowing from the piston-actuating chamber to the tank via the internal channel and the discharge hole when the float is in the open position,
    said float configured to restrict flow of pilot liquid from the piston-actuating chamber to the tank via the internal channel and the discharge hole when in the closed position,
    said downstream portion including a generally laterally extending plate and a sidewall extending generally upwardly from the plate,
    said plate, said sidewall, and said piston cooperatively defining the piston-actuating chamber,
    said downstream portion including a spoked structure disposed axially below the plate,
    said spoked structure including an inner ring, an outer ring, and a plurality of laterally extending arms extending between and interconnecting the inner ring and the outer ring,
    said arms cooperating with the inner ring and the outer ring to define the discharge opening.
23. The system of claim 22,
said downstream portion further including a plurality of risers extending between and interconnecting corresponding ones of the arms and the plate,
said plate, said outer ring, and a pair of adjacent ones of said risers defining a radial slot therebetween,
said radial slot being in fluid communication with the discharge opening.
24. The system of claim 22,
said flow diverter extending generally laterally outwardly from the pilot tube.
25. The system of claim 22,
said valve being configured such that pilot liquid pressure increases in the piston-actuating chamber when the float is in the closed position, whereby the piston shifts from the open position to the closed position.
26. An overfill prevention system for use with a liquid storage tank, said system comprising:
  a valve assembly defining a downwardly open discharge opening configured to discharge liquid at least principally in a downward direction;
  a pilot tube fixed relative to and projecting downwardly relative to the valve assembly,
  said pilot tube defining an internal channel in fluid communication with the valve assembly,
  said pilot tube further defining a discharge hole spaced downwardly from the valve assembly and in fluid communication with the internal channel and the tank;
  a float buoyantly shiftable along the pilot tube between an open position in which the float exposes the discharge hole when liquid within the tank is below a predetermined level and a closed position in which the float covers the discharge hole when liquid within the tank reaches or exceeds the predetermined level; and
  a flow diverter disposed between the discharge opening and the float,
  said flow diverter configured to deflect liquid from the discharge opening away from the float,
  said valve assembly comprising:
    a hollow valve body including—
      an upstream portion defining an inlet configured to receive pressurized liquid for filling of the tank,
      a downstream portion spaced axially from the upstream portion and defining the discharge opening, and
      a valve seat disposed axially between the inlet and the discharge opening;
    a piston axially shiftable within the valve body between an open valve position and a closed valve position,
    said piston being axially spaced from the valve seat in the open valve position so as to enable flow of liquid through the inlet, past the valve seat, through the valve body, through the discharge opening, and into the tank, said piston sealingly engaging the valve seat in the closed valve position so as to restrict flow of liquid past the valve seat, through the valve body, through the discharge opening, and into the tank, said valve body including an outer shell extending between and interconnecting the upstream and downstream portions by means of respective dual-start thread sets.

27. The system of claim 26, said flow diverter extending generally laterally outwardly from the pilot tube.

28. The system of claim 26, said piston and said downstream portion cooperatively defining an expandable piston-actuating chamber, said piston defining an inflow orifice fluidly interconnecting the inlet and the piston-actuating chamber, such that the piston-actuating chamber is configured to receive a pilot flow of the liquid, said downstream portion defining an outflow orifice fluidly interconnecting the piston-actuating chamber and the internal channel, such that the internal channel is configured to receive the pilot flow, with pilot liquid flowing from the piston-actuating chamber to the tank via the internal channel and the discharge hole when the float is in the open position, said float configured to restrict flow of pilot liquid from the piston-actuating chamber to the tank via the internal channel and the discharge hole when in the closed position.

29. The system of claim 28, said valve being configured such that pilot liquid pressure increases in the piston-actuating chamber when the float is in the closed position, whereby the piston shifts from the open position to the closed position.

30. The system of claim 28, said downstream portion including a generally laterally extending plate and a sidewall extending generally upwardly from the plate, said plate, said sidewall, and said piston cooperatively defining the piston-actuating chamber.

\* \* \* \* \*